(12) United States Patent
Guo (10) Patent No.: US 8,837,407 B2
(45) Date of Patent: *Sep. 16, 2014

(54) METHOD AND DEVICE FOR MULTI-USER BEAMFORMING BASED ON A FREQUENCY DIVISION DUPLEX SYSTEM

(75) Inventor: Yang Guo, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 217 days.

This patent is subject to a terminal disclaimer.

(21) Appl. No.: 13/443,893

(22) Filed: Apr. 11, 2012

(65) Prior Publication Data

US 2012/0207050 A1 Aug. 16, 2012

Related U.S. Application Data

(63) Continuation of application No. 12/993,117, filed as application No. PCT/CN2009/072796 on Jul. 16, 2009, now Pat. No. 8,189,498.

(30) Foreign Application Priority Data

May 8, 2009 (CN) .......................... 2009 1 0083530

(51) Int. Cl.
*H04W 4/00* (2009.01)
*H04B 7/06* (2006.01)
*H04B 7/04* (2006.01)
*H04B 7/08* (2006.01)

(52) U.S. Cl.
CPC ............ *H04B 7/0408* (2013.01); *H04B 7/0617* (2013.01); *H04B 7/0665* (2013.01); *H04B 7/0452* (2013.01); *H04B 7/0697* (2013.01); *H04B 7/086* (2013.01)
USPC ........................................ 370/329

(58) Field of Classification Search
CPC .............................. H04B 7/086; H04B 7/0408

USPC ......... 370/295, 328, 329, 276, 281, 334, 347, 370/310; 455/67.14, 67.11, 561, 562
See application file for complete search history.

(56) References Cited

U.S. PATENT DOCUMENTS 6,330,460 B1 12/2001 Wong et al.
6,668,161 B2 * 12/2003 Boros et al. ................ 455/67.14
(Continued)

FOREIGN PATENT DOCUMENTS

| CN | 1643822 A | 7/2005 |
| CN | 101340648 A | 1/2009 |
| CN | 101425832 A | 5/2009 |
| EP | 1631100 A | 3/2006 |

OTHER PUBLICATIONS

International Search Report in international application No. PCT/CN2009/072796, mailed on Feb. 25, 2010. (3 pages—see entire document).

(Continued)

*Primary Examiner* — Hanh N Nguyen
(74) *Attorney, Agent, or Firm* — Oppedahl Patent Law Firm LLC (57) ABSTRACT

The present invention discloses an FDD (Frequency Division Duplex) system based multi-user beamforming method and device. In the method, when two or more user terminals are at respective AOAs (Angles of Arrival), a transmit weight of a downlink signal of each user terminal is determined by using a null-widening algorithm, and the transmit weight is stored in a network side, the network side groups the user terminals based on AOA information reported by the user terminals, a corresponding transmit weight for the downlink signal of each user terminal in each group is selected based on the AOA information of the user terminals in the group, and the selected transmit weight is transmitted after multiplying it by a downlink data stream of the user terminal corresponding to the transmit weight.

11 Claims, 3 Drawing Sheets

(56) References Cited

U.S. PATENT DOCUMENTS

| | | | |
|---|---|---|---|
| 7,352,721 B2 | 4/2008 | Kim et al. | |
| 7,477,190 B2 | 1/2009 | Bang et al. | |
| 7,620,019 B1* | 11/2009 | Smith et al. | 370/334 |
| 8,189,498 B2* | 5/2012 | Guo | 370/295 |
| 2005/0271016 A1 | 12/2005 | Kim et al. | |
| 2007/0164902 A1 | 7/2007 | Bang et al. | |

OTHER PUBLICATIONS

English Translation of the Written Opinion of the International Search Authority in international application No. PCT/CN2009/072796, mailed on Feb. 25, 2010. (4 pages—see entire document).

Supplementary European Search Report in European Application No. 09844270.0, mailed on Mar. 25, 2011. (9 pages—see entire document).

ZTE: "Discussion on Multi-user Beamforming for LTE-A", 3GPP Draft; R1-082844; Discussion on Multi-user Beamforming for LTE-A; 3rd Generation Partnership Project (3GPP), Mobile Competence Centre; 650, Route Des Lucioles ; F-06921 Sophia-Antipolis Cedex ; France, no. Jeju; Aug. 12, 2008. (2 pages—see Supplementary European Search Report in European Application No. 09844270.0 for relevant pages).

Hampson et al., Efficient Multi-Beaming for the Next Generation of Radio Telescopes, Apr. 1, 1999, 16 total pages.

* cited by examiner

METHOD AND DEVICE FOR MULTI-USER BEAMFORMING BASED ON A FREQUENCY DIVISION DUPLEX SYSTEM

This application is a continuation of U.S. application Ser. No. 12/993,117 filed Jul. 16, 2009, which application is incorporated herein by reference for all purposes.

TECHNICAL FIELD

The present invention relates to the field of communications, more particularly to a method and device for multi-user beamforming based on an FDD (Frequency Division Duplex) system.

BACKGROUND

An MIMO (Multiple Input and Multiple Output) system has become a technique drawing much attention in an LTE (Long Term Evolution) system due to its increased channel capacity. In a multi-user MIMO mode, a beamforming direction is devised by is designing suitable weight vectors of transmit antennas and receive antennas, thus multi-user signals can be discriminated and the interference among users can be eliminated.

A beamforming method discriminates users based on their orientations, thus achieving that a plurality of users can multiplex same time and frequency resources, which is more useful for controlling a beam direction in the case of a small antenna interval ($0.5\lambda$). A beamforming technique operates mainly by controlling a beam direction, and is applicable to open suburb scenarios. Beamforming can obtain obvious beam energy gain, and can enlarge cell coverage. In the multi-user MIMO mode, the beamforming direction is devised by designing suitable weight vectors of transmit antennas and receive antennas, the specific shape of a beam is controlled, a main lobe can be formed in a desired direction, and a null steering is formed in an interference direction, thus the interference among users is eliminated. However, at present, how to deal with the beamforming among a plurality of users is still under study. Particularly with respect to how to apply the beamforming into an FDD system, there is no efficient solution provided in the related art.

SUMMARY

The present invention is proposed with a view to applying beamforming into an FDD system, a main object of which is to provide a method and device for multi-user beamforming based on an FDD system so as to implement the beamforming of downlink signals of a plurality of users quickly in the FDD system.

In order to achieve the above-mentioned object, according to an aspect of the present invention, there is provided a method for multi-user beamforming based on an FDD system.

The method for multi-user beamforming based on an FDD system according to the present invention comprises: when two or more user terminals are at respective AOAs (Angle of Arrival), determining a transmit weight of a downlink signal of each user terminal by using a null-widening algorithm, and storing the transmit weight in a network is side; and, the network side grouping user terminals based on AOA information reported by the user terminals, selecting a corresponding transmit weight for the downlink signal of each user terminal in each group based on the AOA information of each user terminal in the group, and through an antenna, transmitting the selected transmit weight after multiplying it by a downlink data stream of the user terminal corresponding to the transmit weight.

Preferably, the above-mentioned method may further comprise: informing each user terminal in each group of the AOA information of all user terminals in the group after the network side groups the user terminals.

Preferably, the above-mentioned AOA may be a quantified value.

Preferably, an identified binary digit may be allocated to the quantified value of AOA, and the quantified value of each AOA may correspond to an identifier composed of the identified binary digit.

Preferably, the user terminal may, after measuring an angle value of AOA, select the nearest quantified value of AOA as a measurement value, and may report the identifier corresponding to the measurement value; and the identifiers to which the AOAs of all user terminals in each group correspond may feed back to the user terminal by the network side.

Preferably, the network side may group the user terminals based on the AOA information reported by the user terminals, wherein specifically, for a four-antenna FDD system, when the difference between the AOAs reported by the user terminals is greater than or equal to 20°, that user terminals may be grouped into one group; and for an eight-antenna FDD system, when the difference between the AOAs reported by the user terminals is greater than or equal to 10°, that user terminals may be grouped into one group.

In order to achieve the above object, according to another aspect of the present invention, there is provided a method for multi-user beamforming based on an FDD system.

The method for multi-user beamforming based on an FDD system according to the present invention comprises: when two or more user terminals are at respective AOAs, is determining a transmit weight of a downlink signal of each user terminal by using a null-widening algorithm, and storing the transmit weight in each user terminal; and, after the user terminals receive AOA information and the downlink signal of each user terminal in the user terminal groups grouped by a network side, determining a transmit weight used by the downlink signal based on the AOA information of each user terminal in the group that the user terminals belong to, and demodulating the downlink signal by using the transmit weight.

Preferably, the way to determine the group the user terminals belong to may be that: for a four-antenna FDD system, when the difference between the AOAs of the user terminals is greater than or equal to 20°, that user terminals are grouped into one group; and for an eight-antenna FDD system, when the difference between the AOAs of the user terminals is greater than or equal to 10°, that user terminals are grouped into one group.

Preferably, the above-mentioned AOA may be a quantified value.

Preferably, an identified binary digit may be allocated to the quantified value of AOA, and the quantified value of each AOA may correspond to an identifier composed of the identified binary digit.

Preferably, the user terminal may, after measuring an angle value of AOA, select the nearest quantified value of AOA as a measurement value, and report the identifier corresponding to the measurement value to the network side; and the network side may feed back to each user terminal in the user terminal groups the identifiers which the AOAs of all user terminals in each group correspond to.

In order to achieve the above object, according to another aspect of the present invention, there is provided a device for multi-user beamforming based on an FDD system.

The device for multi-user beamforming based on an FDD system according to the present invention comprises: a determining unit, used for determining a transmit weight of a downlink signal of each user terminal by using a null-widening algorithm when two or more user terminals are at respective AOAs; a storing unit, used for storing the transmit weight corresponding to the downlink signal of each user terminal when the two or more user terminals are at the respective AOAs; a receiving unit, used for receiving AOA information reported by the user terminals; a grouping unit, used for grouping the user terminals based on the AOA information received by the receiving unit; a selecting unit, used for selecting a corresponding transmit weight for the downlink signal of each user terminal in each group based on the AOA information of each user terminal in the group; and a transmitting unit, used for transmitting the transmit weight selected by the selecting unit after multiplying it by a downlink data stream of the user terminal corresponding to the transmit weight.

Preferably, the device may further comprise an informing unit, used for informing each user terminal in the group grouped by the grouping unit of the AOA information of all user terminals in the group.

Preferably, the grouping unit may group the downlink signals of the user terminals based on the AOA information received by the receiving unit, wherein specifically, for a four-antenna FDD system, when the difference between the AOAs reported by the user terminals is greater than or equal to 20°, the downlink signals of the user terminals are grouped into one group; and for an eight-antenna FDD system, when the difference between the AOAs reported by the user terminals is greater than or equal to 10°, the downlink signals of the user terminals are grouped into one group.

In order to achieve the above object, according to another aspect of the present invention, there is provided a device for multi-user beamforming based on an FDD system.

The device for multi-user beamforming based on an FDD system according to the present invention comprises: a first determining unit, used for determining a transmit weight of a downlink signal of each user terminal by using a null-widening algorithm when two or more user terminals are at respective AOAs; a storing unit, used for storing the transmit weight corresponding to the downlink signal of each user terminal when the two or more user terminals are at the respective AOAs; a receiving unit, used for receiving a downlink signal transmitted by a network side and AOA information of each user terminal in user terminal groups grouped by the network side; a second determining unit, used for determining a transmit weight used by the downlink signal received by the receiving unit based on the AOA information of each user terminal in the group that the user terminal belongs to; and a demodulating unit, used for demodulating the downlink signal by using the transmit weight determined by the second determining unit.

Preferably, the device may further comprise: a measuring unit, used for measuring the AOA of the user terminal based on the downlink signal received by the receiving unit; and a reporting unit, used for reporting the AOA information measured by the measuring unit to the network side.

Preferably, the AOA may be a quantified value.

Preferably, the device may further comprise an identifying unit, used for allocating an identified binary digit to the quantified value of AOA, wherein the quantified value of each AOA corresponds to an identifier composed of the identified binary digit; and after measuring an angle value of AOA of the user terminal, the measuring unit selects the nearest quantified value of AOA as a measurement value, and the reporting unit reports the identifier which the measurement value correspond to the network side.

In the present invention, firstly, the AOA which the user terminal is located at is quantified, and then, when each user terminal in the user terminal group is located at a different AOA, the transmit weight of the downlink signal of each user terminal is computed by using the null-widening algorithm, and after the computation is completed the transmit weight is stored in the network side and the user terminal, respectively. Thus, when the beamforming is performed on a plurality of user terminals, based on the AOA information reported by each user terminal and the number of the user terminals, and based on the correspondence between the stored AOA that each user terminal in the user terminal group is located at and the transmit weight of the downlink signal of the user terminal, the transmit weight of the downlink signal of the user terminal is determined directly, without determining the transmit weight of beamforming of the downlink signal of each user terminal in the user terminal group in real time. Therefore, the computation burden of the network side can be reduced, the efficiency of the beamforming can be enhanced, and thus the capacity of the FDD system can be increased while ensuring the communication quality.

The other features and advantages of the present invention will be described in the specification below, and become obvious in part from the specification or understood through implementing the present invention. The object and other advantages of the present invention can be achieved and gained through the structure specifically pointed out in the specification, claims or drawings.

BRIEF DESCRIPTION OF THE DRAWINGS

The drawings described here are used to provide further understanding for the present invention, and constitute a part of this application. The exemplary embodiments and description of the present invention are used to explain the present invention, and do not constitute an undue limitation to the present invention. In the drawings.

DETAILED DESCRIPTION

Function Overview

In the technical solutions of the embodiments of the present invention, firstly, the AOA which the user terminal is located at is quantified, and then the transmit weight of the downlink signal of the user terminal, when each user terminal of the user terminal group is at a different AOA, is computed by using the null-widening algorithm, and after the computation is completed, the transmit weight is stored in the network side and each user terminal respectively. Thus, when the beamforming is performed on a plurality of user terminals, the transmit weight of the downlink signal of the user terminal is is determined directly, based on the AOA information reported by each user terminal and the number of the user terminals, and based on the correspondence between the stored AOA that each user terminal of the user terminal group is located at and the transmit weight of the downlink signal of the user terminal, and thus it is no need to determine the transmit weight of beamforming of the downlink signal of each user terminal in the user terminal group in real time. Therefore, the computation burden of the network side can be reduced, the efficiency of the beamforming can be enhanced, and thus the capacity of the FDD system can be increased while ensuring the communication quality.

The present invention will be detailed below with reference to the drawings in conjunction with the embodiments. It should be pointed out that in case of no confliction, the embodiments and the features in the embodiments in this application could be combined with each other.

Method Embodiment 1

According to an embodiment of the present invention, it is provided a method for multi-user beamforming based on an FDD system.

Figure 1:
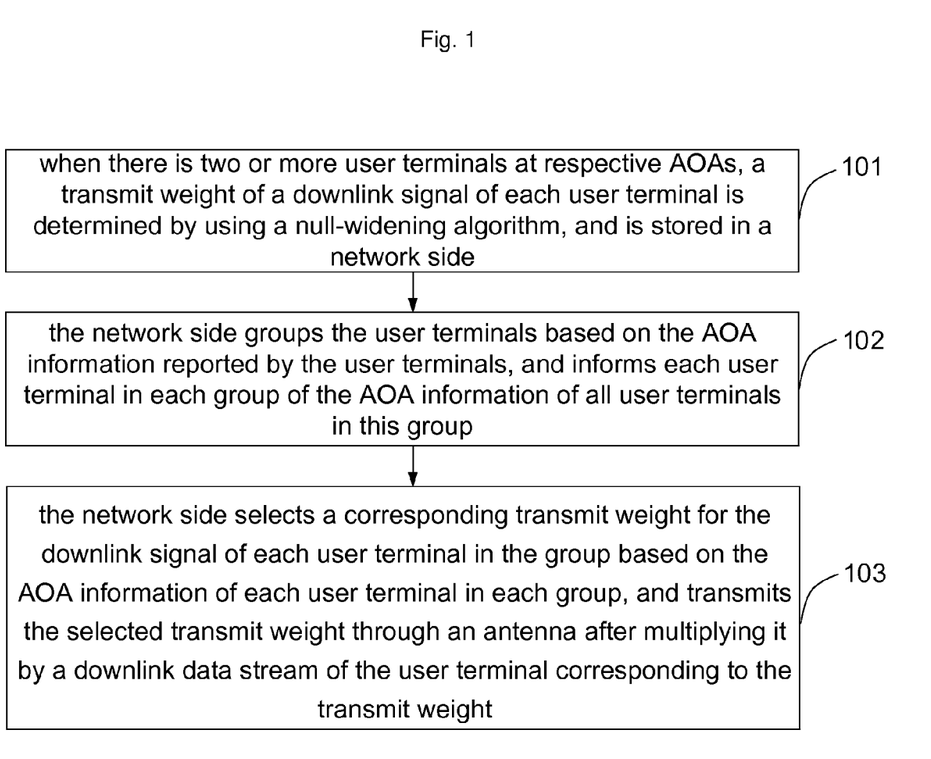
FIG. 1 is a flow chart of a method for multi-user beamforming based on an FDD system according to Method Embodiment 1 of the present invention.

FIG. 1 is a flow chart of a method for multi-user beamforming based on an FDD system according to Method Embodiment 1 of the present invention. As shown in FIG. 1, the method for multi-user beamforming based on an FDD system in the embodiment comprises the following steps 101 to 103.

Step 101: when there is two or more user terminals at respective AOAs, a transmit weight of a downlink signal of each user terminal is determined by using a null-widening algorithm, and is stored in a network side.

In the present invention, the AOA between a user terminal and a network side (base station) is identified in a quantification way. Taking a cell with three sectors as an example, the range that the sector covers is between −60°~60°, while the range of the AOA where the user terminal is located is 120°. The AOA of the user terminal can be quantified into such 10 angle values as −55°, −45°, −35°, −25°, −15°, −5°, 5°, 15°, 25°, 35°, 45° and 55°. It should be pointed out that the above-mentioned quantified angles are preferably those which equally divide the whole sector, so that, after the user terminal measures an actual AOA, the user terminal selects the angle nearest to the is above-mentioned quantified value as its AOA, and reports the AOA to the network side. Those skilled in the art should understand that, the more the number of the quantified values is, the more accurate the AOA reported by the user terminal is. In order to facilitate identification, the AOAs can be quantified into 16 values, and the angle values of the AOAs are as follows, respectively:

$$\begin{Bmatrix} -56.25 & -48.75 & -41.25 & -33.75 & -26.25 & -18.75 & -11.25 & -3.75 \\ 3.75 & 11.25 & 18.75 & 26.25 & 33.75 & 41.25 & 48.72 & 56.25 \end{Bmatrix}$$

Thus, the AOA that each user terminal is located at can be identified through a 4-bit binary character.

According to the quantified values of the AOAs, the transmit weight of the downlink signal of the user terminal is determined when a plurality of user terminals perform beamforming in the case of various AOAs. For example, when performing the beamforming on downlink signals of two user terminals, the transmit weight of the downlink signal of each user terminal is computed by using the null-widening algorithm when the two user terminals are located at the above 16 AOAs respectively. Those skilled in the art should understand that the null-widening algorithm is a mature beamforming algorithm, which can perform beamforming on the downlink signals of two or more user terminals, so that after the beamforming, the direction of the main lobe of the downlink signal is located at the direction of the AOA reported by the user terminal which the downlink signal belong to, and the directions of the null steering of the downlink signals are located in the direction of the main lobes of the downlink signals of the other user terminals. The detail of the null-widening algorithm will not be detailed here. In the case of three user terminals, the transmit weights of the downlink signals of the user terminals when performing beamforming are determined, respectively.

The information about the correspondence between the determined AOA that the user terminal is located at and the transmit weight of the downlink signals of each user terminal is stored in the network side.

Step 102: the network side groups the user terminals based on the AOA information reported by the user terminals, and informs each user terminal in each group of the AOA information of all user terminals in this group.

In the FDD system, since frequency ranges that an uplink channel and a downlink channel are located in are different, the network side can not obtain downlink channel information through uplink channel information directly, and thus the network side can not obtain the AOA of the user terminal by using matrix information of the downlink channel. However, in the FDD system, the measurement of the AOA between the user terminal and the base station can be carried out by the user terminal, and the user terminal completes channel estimation of the downlink signal based on a common pilot, thus obtains the matrix information of the downlink channel, and computes the AOA between the user terminal and the base station that transmits the downlink signal based on the matrix information of the downlink channel. Those skilled in the art should understand that it is an existing technique that a user terminal completes the measurement of an AOA based on a downlink signal, the specific measurement manner will not be given here.

After the user terminal completes the measurement of the AOA, how to report AOA information is also a knotty problem. In order to save reporting resources, the present invention adopts the above-mentioned method for quantifying the AOA, and reports the measured AOA by reporting the identifier that corresponds to the quantified AOA. The above process will be detailed below.

Each quantified AOA angle value is identified by using a binary digit. Taking the above-mentioned AOA range between −60°-60° being quantified into the foregoing 16 values as an example, the 16 AOA angle values can be identified by using a 4-bit binary character, and the 16 AOA angle values correspond to binary digits from "0000" to "1111". For example, if the user terminal measures the actual AOA value to be 10°, then the quantified angle 11.25° that is nearest to 10° is selected as a measurement value, and is reported to the network side. At this time, the binary digit "0110" is selected to be reported to the network side (base station). Because the system has arranged the correspondence between the reported binary digit and the AOA value measured by the user terminal, the AOA of the user terminal can be determined as 11.25° after the base station receives the value of "0110". The resources, which carried the precoding matrix indication (PMI) information originally, are used for carrying AOA information. When the is AOA value measured by the user terminal is between two quantified values, the binary digits corresponding to such two quantified values on the left and right will be reported.

The network side groups the downlink signals that are to be transmitted based on the AOA reported by each user terminal. The principle of the grouping mainly is that no interference will be caused between the downlink signals in the group, and at least, in the main lobe of the downlink signal after the beamforming, there can not be any interference from side lobes of other downlink signals. The present invention can, by using the null-widening algorithm, ensure that the null steering of the downlink signal of each user terminal in the user terminal group is located in the main lobes of the downlink signals of other user terminals, so as to reduce the interference between the downlink signals in the user terminal group to a minimum. In view of the beamforming requirement of the present invention, if the angle difference between the downlink signals in direction of main lobes is relatively small, then it is unable to meet the requirement that the null steering of other downlink signals are located in the main lobe of some downlink signal. Therefore, the principle of the present invention for grouping the downlink signals is: for a 4-antenna FDD system, when the difference between the AOAs corresponding to the user terminals is greater than or equal to 20°, the user terminals are grouped into a group, and preferably, for the 4-antenna FDD system, when the difference between the AOAs corresponding to the user terminals is greater than or equal to 40°, the user terminals are grouped into a group; and, for an 8-antenna FDD system, when the difference between the AOAs corresponding to the user terminals is greater than or equal to 10°, the user terminals are grouped into a group, and preferably, for the 8-antenna FDD system, when the difference between the AOAs corresponding to user terminals is greater than or equal to 20°, the user terminals are grouped into a group.

After the user terminal group is determined, each user terminal in the user terminal group will be informed respectively of AOA information of all user terminals in the group. The informing manner can adopt the above-mentioned one in which the user terminals report the AOA information, i.e., each user terminal in the user terminal group is informed by using the binary character corresponding to the quantified AOA.

Step 103: the network side selects a corresponding transmit weight for the downlink signal of each user terminal in the group based on the AOA information of each user terminal in each group, and transmits the selected transmit weight through an antenna after multiplying it by a downlink data stream of the user terminal corresponding to the transmit weight.

By using the information of the AOA where each user terminal in the allocated user terminal group is located, and based on the correspondence, stored in the network side, between the AOA where each user terminal in the user terminal group is located and the transmit weight of downlink signal of each user terminal, the network side determines the transmit weight of the downlink signal of each user terminal in the user terminal group; the network side multiplies the selected transmit weight by the downlink data signal to be transmitted before transmitting the downlink data signal to the user terminals, then loads common reference signal (CRS), and transmits the downlink data signal via the transmit antenna of the network side, thus completing downlink beamforming of the user terminal group.

The transmit weight selected by the network side has been obtained through computation by using the null-widening algorithm, therefore, after the transmit weight is multiplied with the downlink data signal in the user terminal group, the downlink beamforming of the user terminal group has been completed. Since a computing process of the beamforming has been done in advance, it is unnecessary for the network side to perform the computation of real-time beamforming for the downlink signal of each user terminal in the user terminal group, and what needs to be done is only to select the transmit weight of beamforming for the user terminal. Thus, this solution can reduce the operation load of the network side.

Those skilled in the art would understand that, the method shown in FIG. 1 is applicable to the network side (base station) of the FDD system.

Method Embodiment 2

According to an embodiment of the present invention, there is provided a method for multi-user beamforming based on an FDD system.

Figure 2:
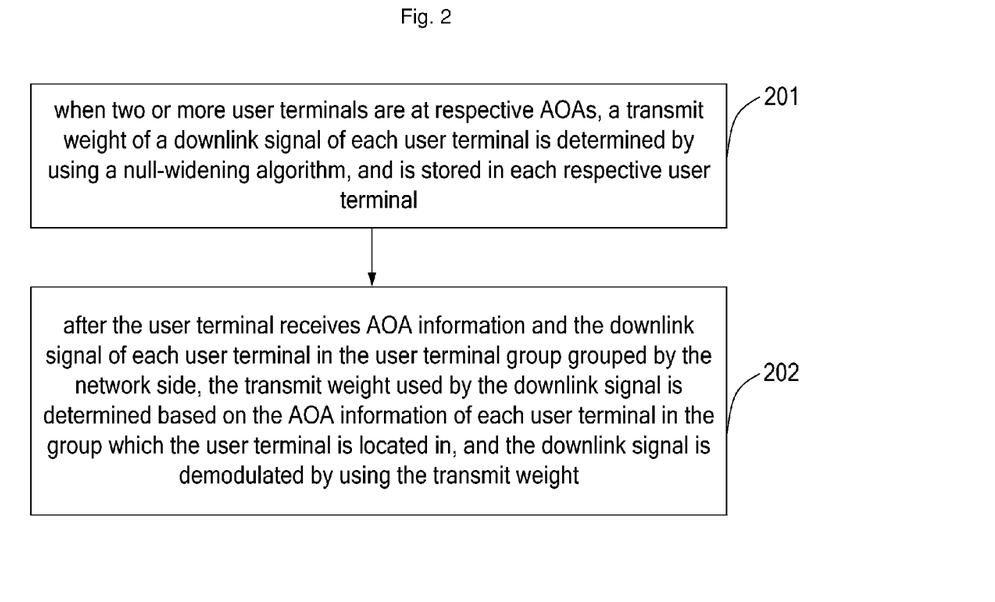
FIG. 2 is a flow chart of a method for multi-user beamforming based on an FDD system according to Method Embodiment 2 of the present invention.

FIG. 2 is a flow chart of a method for multi-user beamforming based on an FDD system according to Method Embodiment 2 of the present invention. As shown in FIG. 2, the method for multi-user beamforming based on an FDD system according to the present embodiment comprises the following steps 201 to 202.

Step 201: when two or more user terminals are at respective AOAs, a transmit weight of a downlink signal of each user terminal is determined by using a null-widening algorithm, and is stored in each respective user terminal.

In the present invention, the AOA between a user terminal and a network side (base station) is identified in a quantification way. Refer to the above-mentioned step 101 for the implementation detail of this step. The only difference from step 101 is that, in this embodiment, the information about the correspondence between the determined AOA that each user terminal in the user terminal group is located at and the transmit weight of the downlink signal of each user terminal is stored in all the user terminals in the FDD system. Here, the information about the correspondence between the AOA that each user terminal in the user terminal group is located at and the transmit weight of the downlink signal of each user terminal is configured in the user terminals as configuration information, i.e., the correspondence information has been configured before the user terminals leave the factory, or is configured when the user terminals enter into the network.

Step 202: after the user terminal receives AOA information and the downlink signal of each user terminal in the user terminal group grouped by the network side, the transmit weight used by the downlink signal is determined based on the AOA information of each user terminal in the group which the user terminal is located in, and the downlink signal is demodulated by using the transmit weight.

After the user terminal receives the AOA information and the downlink signal of each user terminal in the user terminal group grouped by the network side, it is determined that beamforming processing has been performed on the downlink signal that is transmitted by the network side. At this time, based on the AOA information of each user terminals in the user terminal group grouped by the network side, the transmit weight used by the network side for the current downlink signal is determined and is used for demodulating the received downlink signal.

The method for multi-user beamforming based on an FDD system according to this embodiment further comprises the steps of: after the user terminal measures an angle valued of AOA, it selects the nearest quantified value of AOA as a measurement value, and reports an identifier consisting of a binary digit corresponding to the measurement value to the network side; and the network side sends identifiers which the AOAs of all user terminals in each group correspond to to each user terminal in the user terminal group. Refer to the related description in the above-mentioned step 102 for the manner in which the user terminal reports the AOA information, the details will not be repeated here. The network side informs the user terminal of the AOA information of all user terminals in the user terminal group also by using the binary identifiers as described in step 102. The user terminal can determine the angle value of AOA informed by the network side only based on the correspondence between the identifiers and the AOA angle values.

Those skilled in the art would understand that, the method shown in FIG. 2 is applicable to the user terminal side of the FDD system.

According to the embodiments of the present invention, there is further provided a computer readable medium, which stores instructions executable by a computer thereon. When the instructions are executed by a computer or processor, the computer or processor is made to execute the processing of the steps shown in FIGS. 1 and 2. Preferably, the above method embodiments can be executed.

Device Embodiment 1

According to an embodiment of the present invention, there is provided a device for multi-user beamforming based on an FDD system.

Figure 3:
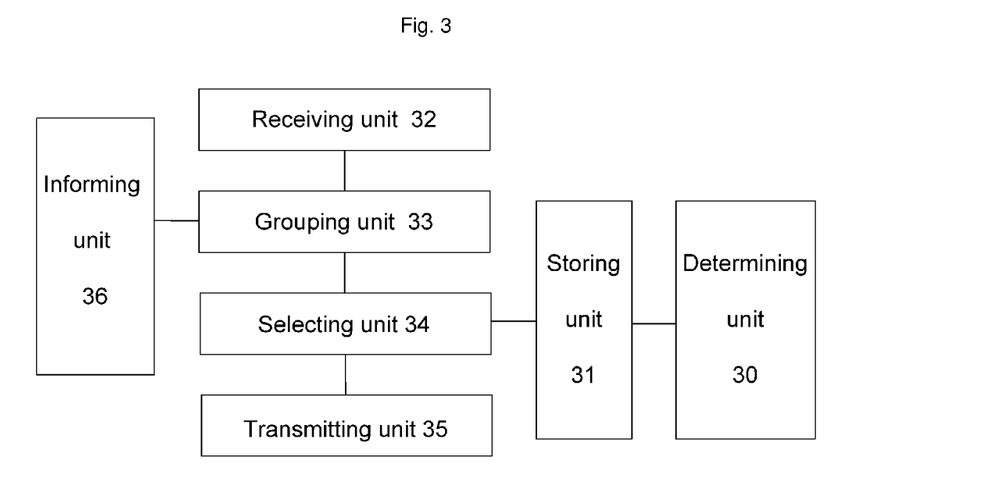
FIG. 3 is a schematic diagram of the composition structure of a device for multi-user beamforming based on an FDD system according to Device Embodiment 1 of the present invention.

FIG. 3 is a schematic diagram of the constitutional structure of a device for multi-user beamforming based on an FDD system according to Device Embodiment 1 of the present invention. As shown in FIG. 3, the device for multi-user beamforming based on an FDD system according to the present embodiment comprises a determining unit 30, a storing unit 31, a receiving unit 32, a grouping unit 33, a selecting unit 34 and a transmitting unit 35. The determining unit 30 is used for, when two or more user terminals are at respective AOAs, determining a transmit weight of a downlink signal of each user terminal by using a null-widening algorithm. The storing unit 31 is used for storing the transmit weight corresponding to the downlink signal of each user terminal when the two or more user terminals are at the respective AOAs. The receiving unit 32 is used for receiving AOA information reported by the user terminals. The grouping unit 33 is used for grouping the user terminals based on the AOA information received by the receiving unit 32, the principle of the grouping is that: for a 4-antenna FDD system, when the difference between the AOAs corresponding to the user terminals is greater than or equal to 20°, the user terminals are grouped into a group, and preferably, for the 4-antenna FDD system, when the difference between the AOAs corresponding to the user terminals is greater than or equal to 40°, the user terminals are grouped into a group; and, for an 8-antenna FDD system, when the difference between the AOAs corresponding to the user terminals is greater than or equal to 10°, the user terminals are grouped into a group, and preferably, for the 8-antenna FDD system, when the difference between the AOAs corresponding to the user terminals is greater than or equal to 20°, the user terminals are grouped into a group. The selecting unit 34 is used for, according to the AOA information of the user terminals in each group, selecting a corresponding transmit weight for the downlink signal of each user terminal in the group. The transmitting unit 35 is used for transmitting the transmit weight selected by the selecting unit after multiplying it by a downlink data stream of the user terminal corresponding to the transmit weight.

As shown in FIG. 3, the device for multi-user beamforming based on an FDD system according to the present embodiment further comprises an informing unit 36, which is used for informing each user terminal in the user terminal group which is grouped by the grouping unit 33 of the AOA information of all user terminals in the group. Those skilled in the art would appreciate that the informing unit 36 is an optional component of the device for multi-user beamforming based on an FDD system according to this embodiment.

Those skilled in the art would appreciate that the device for multi-user beamforming based on an FDD system shown in FIG. 3 is designed for implementing the device for multi-user beamforming based on an FDD system shown in FIG. 1, and the functions implemented by the processing units in the device for multi-user beamforming based on an FDD system shown in FIG. 3 can be understood by referring to the related description in the method shown in FIG. 1. The functions of the units in the device for multi-user beamforming based on an FDD system shown in FIG. 3 can be implemented by running programs in a processor, or can also be implemented by a specific logic circuit. For example, the storing unit 31 therein can be implemented by various storing devices such as a flash memory, while the receiving unit 32 can be implemented by a receiving antenna processing system.

Device Embodiment 2

According to an embodiment of the present invention, there is provided a device for multi-user beamforming based on an FDD system.

Figure 4:
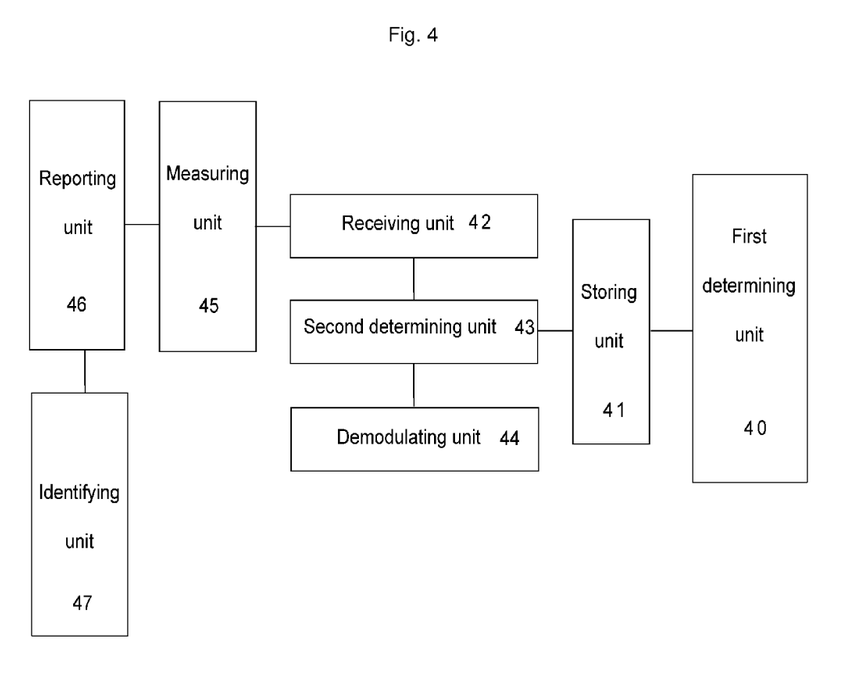
FIG. 4 is a schematic diagram of the composition structure of a device for multi-user beamforming based on an FDD system according to Device Embodiment 2 of the present invention.

FIG. 4 is a schematic diagram of the constitutional structure of a device for multi-user beamforming based on an FDD system according to Device Embodiment 2 of the present invention. As shown in FIG. 4, the device for multi-user beamforming based on an FDD system according to the present embodiment comprises: a first determining unit 40, a storing unit 41, a receiving unit 42, a second determining unit 43 and a demodulating unit 44. The first determining unit 40 is used for, when two or more user terminals are at respective AOAs, determining a transmit weight of a downlink signal of each user terminal by using a null-widening algorithm. The storing unit 41 is used for storing the transmit weight corresponding to the downlink signal of each user terminal when the two or more user terminals are at the respective AOAs. The receiving unit 42 is used for receiving a downlink signal transmitted by a network side and AOA information of each user terminal in a user terminal group grouped by the network side. The second determining unit 43 is used for determining the transmit weight used by the downlink signal received by the receiving unit 42 based on the AOA information of each user terminal in the group that the user terminal is located in. The demodulating unit 44 is used for demodulating the downlink signal using the transmit weight determined by the second determining unit 43.

As shown in FIG. 4, the device for multi-user beamforming based on an FDD system according to the present embodiment further comprises a measuring unit 45 and a is reporting unit 46. The measuring unit 45 is used for measuring the AOA of the user terminal by using the downlink signal received by the receiving unit 42. The reporting unit 46 is used for reporting the information of the AOA measured by the measuring unit 45 to the network side.

As shown in FIG. 4, the device for multi-user beamforming based on an FDD system according to the present embodiment further comprises an identifying unit 47, which is used for allocating an identified binary digit to a quantified value of AOA, wherein the quantified value of each AOA corresponds to an identifier composed of the identified binary digit. After the measuring unit 45 measures an angle value of AOA of the user terminal, the nearest quantified value of AOA is selected as a measurement value, and the reporting unit 46 reports the identifier composed of a binary digit, corresponding to the measurement value to the network side.

Those skilled in the art would appreciate that the measuring unit 45, the reporting unit 46 and the identifying unit 47 are all optional components of the device for multi-user beamforming based on an FDD system according to this embodiment, wherein, the measuring unit 45 and the reporting unit 46 must be used simultaneously.

Those skilled in the art would appreciate that the device for multi-user beamforming based on an FDD system shown in FIG. 4 is designed for implementing the method for multi-user beamforming based on an FDD system shown in FIG. 2, and the functions implemented by the processing units in the device for multi-user beamforming based on an FDD system shown in FIG. 4 can be understood by referring to the related description in the method shown in FIG. 2. The functions of the units in the device for multi-user beamforming based on an FDD system shown in FIG. 4 can be implemented by running programs in a processor, or can also be implemented by a specific logic circuit. For example, the storing unit 41 therein can be implemented by various storing devices such as a flash memory, while the reporting unit 46 can be implemented by a transmitting antenna processing system.

The method and device for multi-user beamforming based on an FDD system provided by the present invention realize the application of beamforming to an FDD system. The computation burden of the network side can be reduced, the efficiency of is the beamforming can be enhanced, and thus the capacity of the FDD system can be increased while ensuring the communication quality.

The present invention is implemented without modifying the system architecture and the current process flow, thus it is easy to be carried out, facilitates the popularization in technical fields, and has a relatively strong industrial applicability.

The above-mentioned descriptions are just preferred embodiments of the present invention, and are not used to limit the present invention. For those skilled in the art, there can be various modifications and variations in the present invention. All modifications, equivalent substitutes and improvements within the spirit and principle of the present invention should be included into the protection scope of the present invention.

The invention claimed is:

1. A method for multi-user beamforming based on a frequency division duplex system comprising:
when two or more user terminals are at respective angles of arrival (AOAs), determining a transmit weight of a downlink signal of each user terminal by using a null-widening algorithm, and storing the transmit weight in a network side; and
the network side grouping the user terminals based on AOA information reported by the user terminals, selecting a corresponding transmit weight for the downlink signal of each user terminal in each group based on the AOA information of each user terminal in the group, and transmitting the selected transmit weight after multiplying it by a downlink data stream of the user terminal corresponding to the transmit weight,
wherein the method further comprises:
after grouping the user terminals, the network side informing each user terminal in each group of AOA information of all user terminals in the group.

2. The method according to claim 1, wherein the AOA is a quantified value; an identified binary digit is allocated to the quantified value of AOA, and the quantified value of each AOA corresponds to an identifier composed of the identified binary digit.

3. The method according to claim 2, wherein the network side groups the user terminals based on the AOA information reported by the user terminals, wherein specifically,
for a four-antenna FDD system, when the difference between the AOAs reported by the user terminals is greater than or equal to 20°, that user terminals are grouped into one group; and
for an eight-antenna FDD system, when the difference between the AOAs reported by the user terminals is greater than or equal to 10°, that user terminals are grouped into one group.

4. A method for multi-user beamforming based on a frequency division duplex system, comprising:
when two or more user terminals are at respective AOAs, determining a transmit weight of a downlink signal of each user terminal by using a null-widening algorithm, and storing the transmit weight in each user terminal; and,
after the user terminal receives AOA information and the downlink signal of each user terminal in a user terminal group grouped by an network side, the user terminal determining a transmit weight used by the downlink signal based on the AOA information of each user terminal in the group that the user terminal belongs to, and demodulating the downlink signal by using the transmit weight.

5. The method according to claim 4, wherein the way to determine the group the user terminal belongs to is that:
for a four-antenna FDD system, when the difference between the AOAs of the user terminals is greater than or equal to 20°, that user terminals are grouped into one group; and
for an eight-antenna FDD system, when the difference between the AOAs of the user terminals is greater than or equal to 10°, that user terminals are grouped into one group.

6. The method according to claim 5, wherein the AOA is a quantified value; an identified binary digit is allocated to the quantified value of AOA, and the quantified value of each AOA corresponds to an identifier composed of the identified binary digit.

7. A device for multi-user beamforming based on a frequency division duplex system, comprising:
a determining unit, used for determining a transmit weight of a downlink signal of each user terminal by using a null-widening algorithm when two or more user terminals are at respective AOAs;
a storing unit, used for storing the transmit weight corresponding to the downlink signal of each user terminal when the two or more user terminals are at the respective AOAs;
a receiving unit, used for receiving AOA information reported by the user terminals;
a grouping unit, used for grouping the user terminals based on the AOA information received by the receiving unit;
a selecting unit, used for selecting a corresponding transmit weight for the downlink signal of each user terminal in each group based on the AOA information of each user terminal in the group;
a transmitting unit, used for transmitting the transmit weight selected by the selecting unit after multiplying it by a downlink data stream of the user terminal corresponding to the transmit weight; and an informing unit, used for informing each user terminal in the group grouped by the grouping unit of the AOA information of all user terminals in the group.

8. The device according to claim 7, wherein the grouping unit groups the downlink signals of the user terminals based on the AOA information received by the receiving unit, wherein specifically, for a four-antenna FDD system, when the difference between the AOAs reported by the user terminals is greater than or equal to 20°, the downlink signals of the user terminals are grouped into one group; and for an eight-antenna FDD system, when the difference between the AOAs reported by the user terminals is greater than or equal to 10°, the downlink signals of the user terminals are grouped into one group.

9. A device for multi-user beamforming based on a frequency division duplex system, comprising:

a first determining unit, used for determining a transmit weight of a downlink signal of each user terminal by using a null-widening algorithm when two or more user terminals are at respective AOAs;

a storing unit, used for storing the transmit weight corresponding to the downlink signal of each user terminal when the two or more user terminals are at the respective AOAs;

a receiving unit, used for receiving a downlink signal transmitted by a network side and AOA information of each user terminal in user terminal groups grouped by the network side;

a second determining unit, used for determining the transmit weight used by the downlink signal received by the receiving unit based on the AOA information of each user terminal in the group that the user terminal belongs to; and a demodulating unit, used for demodulating the downlink signal by using the transmit weight determined by the second determining unit.

10. The device according to claim 9, the device further comprising:

a measuring unit, used for measuring the AOA of the user terminal by using the downlink signal received by the receiving unit; and a reporting unit, used for reporting the AOA information measured by the measuring unit to the network side.

11. The device according to claim 9, wherein the AOA is a quantified value.

* * * * *